(12) United States Patent
Diard

(10) Patent No.: US 10,116,943 B2
(45) Date of Patent: Oct. 30, 2018

(54) ADAPTIVE VIDEO COMPRESSION FOR LATENCY CONTROL

(71) Applicant: NVIDIA CORPORATION, Santa Clara, CA (US)

(72) Inventor: Franck R. Diard, Saint-Contest (FR)

(73) Assignee: NVIDIA CORPORATION, Santa Clara, CA (US)

( * ) Notice: Subject to any disclaimer, the term of this patent is extended or adjusted under 35 U.S.C. 154(b) by 638 days.

(21) Appl. No.: 14/055,676

(22) Filed: Oct. 16, 2013

(65) Prior Publication Data

US 2015/0103880 A1 Apr. 16, 2015

(51) Int. Cl.
| H04N 19/107 | (2014.01) |
| H04N 19/162 | (2014.01) |
| H04N 19/172 | (2014.01) |
| H04N 19/12  | (2014.01) |
| H04N 19/177 | (2014.01) |

(52) U.S. Cl.
CPC ........... *H04N 19/162* (2014.11); *H04N 19/12* (2014.11); *H04N 19/177* (2014.11)

(58) Field of Classification Search
CPC .................................................. H04N 19/162
See application file for complete search history.

(56) References Cited

U.S. PATENT DOCUMENTS

| 5,488,570 A * | 1/1996 | Agarwal | H04N 7/15 345/501 |
| 5,949,948 A * | 9/1999 | Krause | H04N 5/9262 386/230 |
| 6,125,398 A * | 9/2000 | Mirashrafi | H04L 12/1822 370/263 |
| 6,862,320 B1 * | 3/2005 | Isu | H04N 7/52 375/240.27 |
| 7,647,614 B2 * | 1/2010 | Krikorian | H04N 21/4398 725/110 |
| 7,953,281 B2 * | 5/2011 | Yoshida | H04N 19/139 375/240.16 |
| 8,126,276 B2 * | 2/2012 | Bolle | G06T 9/001 375/E7.026 |
| 8,443,398 B2 * | 5/2013 | Swenson | H04L 47/10 348/384.1 |
| 8,527,646 B2 * | 9/2013 | Khatib | G06F 3/048 707/603 |
| 8,649,668 B2 * | 2/2014 | Moorer | H04N 21/23424 386/343 |

(Continued)

*Primary Examiner* — Christopher S Kelley
*Assistant Examiner* — Asmamaw G Tarko
(74) *Attorney, Agent, or Firm* — Artegis Law Group, LLP

(57) ABSTRACT

One embodiment of the present invention sets forth a technique for adaptively compressing video frames. The technique includes encoding a first plurality of video frames based on a first video compression algorithm to generate first encoded video frames and transmitting the first encoded video frames to a client device. The technique further includes receiving a user input event, switching from the first video compression algorithm to a second video compression algorithm in response to the user input event, encoding a second plurality of video frames based on the second video compression algorithm to generate second encoded video frames, and transmitting the second encoded video frames to the client device.

21 Claims, 7 Drawing Sheets

(56) References Cited

U.S. PATENT DOCUMENTS

| | | | | |
|---|---|---|---|---|
| 8,687,656 | B2* | 4/2014 | Zhang | H04L 29/06027 370/486 |
| 8,949,447 | B2* | 2/2015 | Hellgren | H04L 63/20 709/229 |
| 2003/0039308 | A1* | 2/2003 | Wu | H04N 19/503 375/240.12 |
| 2003/0206558 | A1* | 11/2003 | Parkkinen | G10L 19/24 370/477 |
| 2004/0181813 | A1* | 9/2004 | Ota | H04N 5/4401 725/131 |
| 2005/0053135 | A1* | 3/2005 | Haskell | H04N 19/147 375/240.15 |
| 2007/0274382 | A1* | 11/2007 | Hickey | H03M 7/40 375/240.03 |
| 2008/0170564 | A1* | 7/2008 | Shi | H04N 21/23424 370/386 |
| 2008/0313555 | A1* | 12/2008 | Speicher | H04N 21/23406 715/765 |
| 2009/0128708 | A1* | 5/2009 | Huffman | H04N 17/004 348/705 |
| 2011/0055441 | A1* | 3/2011 | Uchiyama | H04N 19/46 710/68 |
| 2013/0132462 | A1* | 5/2013 | Moorer | H04N 21/2343 709/203 |
| 2013/0215774 | A1* | 8/2013 | Bender | H04L 65/1083 370/252 |
| 2013/0246643 | A1* | 9/2013 | Luby | H04N 21/23439 709/231 |

* cited by examiner

ADAPTIVE VIDEO COMPRESSION FOR LATENCY CONTROL

BACKGROUND OF THE INVENTION

Field of the Invention

Embodiments of the present invention generally relate to computer networking and, more specifically, to adaptive video compression for latency control.

Description of the Related Art

Cloud computing software generally enables end-users to view and interact with applications executing on a remote computing device. For example, an end-user may operate a local client to establish a connection with a remote computer via a local area network (LAN) or wide area network (WAN). Once a connection is established, the remote computer may transmit graphical user interface (GUI) images to the local client. The end-user may then operate an input device (e.g., mouse, keyboard, gamepad, touch screen, etc.) associated with the local client to interact with applications executing on the remote computer. The resulting input events are then transmitted from the local client to the remote computer, which receives the input events, renders updated GUI images based on the input events, and transmits the updated GUI images back to the local client.

In order to reduce the latency and bandwidth requirements associated with transmitting GUI images from the remote computer to the local client, the remote computer may compress the images prior to transmission. For example, the remote computer may apply a video compression algorithm (e.g., H.264, High Efficiency Video Coding (HEVC), etc.) to GUI images to reduce the bit rate associated with the images. As a result, the compressed image data may be transmitted to the local client more quickly, allowing GUI images to be displayed on the local client at a higher frame rate, for example, when the end-user is operating the local client on a low bandwidth data connection.

Although applying a compression algorithm may reduce the amount of data transmitted to the local client, decreasing transmission time, one drawback to the above approach is that the process of applying the compression algorithm to generate compressed image data may itself significantly increase latency. This increased latency may significantly detract from the user experience when an end-user is interacting with a real-time and/or latency-sensitive application executing on the remote computer, such as a video game.

Accordingly, there is a need in the art for a more efficient way to transmit GUI images in cloud computing applications.

SUMMARY OF THE INVENTION

One embodiment of the present invention sets forth a method for adaptively compressing video frames. The method includes encoding a first plurality of video frames based on a first video compression algorithm to generate first encoded video frames and transmitting the first encoded video frames to a client device. The method further includes receiving a user input event, switching from the first video compression algorithm to a second video compression algorithm in response to the user input event, encoding a second plurality of video frames based on the second video compression algorithm to generate second encoded video frames, and transmitting the second encoded video frames to the client device Further embodiments provide, among other things, a non-transitory computer-readable medium and a computing device configured to carry out method steps set forth above.

Advantageously, the disclosed technique enables a video compression algorithm to be dynamically selected to compress GUI images based on whether a user is currently interacting with the GUI. A high compression ratio algorithm may be used when a user has not interacted with the GUI for a threshold period of time, and a low-latency algorithm may be used while the user is interacting with the GUI and/or when the user has previously interacted with the GUI within a threshold period of time. Thus, the disclosed technique, among other things, provides a lower-bandwidth remote connection when a user is not interacting with the GUI and a lower-latency remote connection when the user is interacting with the GUI, thereby enabling more effective interactions with real-time and/or latency-sensitive applications.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1A:
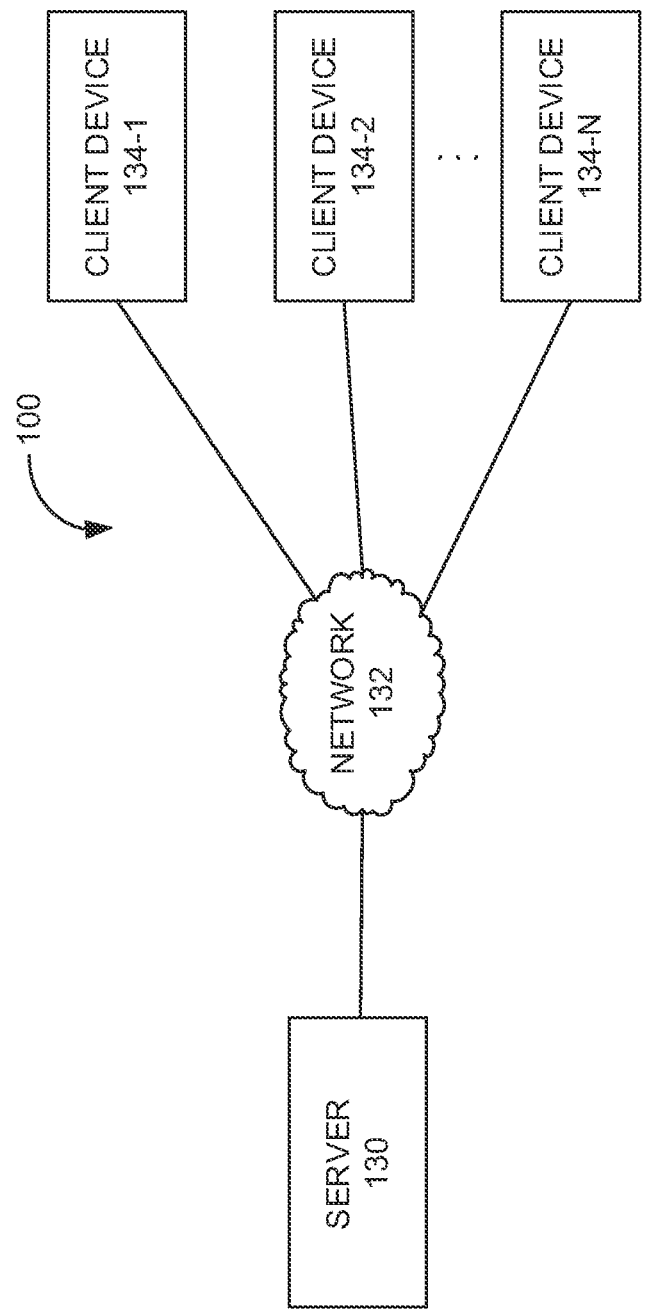
FIG. 1A illustrates a system configured to implement one or more aspects of the present invention.

FIG. 1A illustrates a system 100 configured to implement one or more aspects of the present invention. As shown, the system 100 includes, without limitation, a server 130 configured to transmit data to and receive data from one or more client devices 134 through a network 132. More specifically, as discussed in greater detail below in conjunction with FIGS. 1B and 1C, the server 130 executes at least one software application and a server input event engine. The software application generates graphical user interface (GUI) images, which are compressed by an encoder and transmitted to a client device 134. The client device 134 decodes and displays the GUI mages to a user. The user then interacts with the GUI by operating an input device, such as a touchscreen and/or gamepad, associated with the client device 134. A client input event engine executing on the client device 134 receives user input generated with the input device(s) and transmits user input events to the server 130.

At the server 130, the server input event engine receives the user input events and determines that the user is currently interacting with the GUI. In response, the server input event engine instructs the encoder to switch from a high compression ratio algorithm to a low-latency compression algorithm. Subsequent GUI images are then compressed using the low-latency compression algorithm and transmitted to the client device 134.

The server input event engine further determines whether a threshold period of time has elapsed since a user input event was last received from the client device 134. If a user input event has not been received within the threshold period of time, then the server input engine instructs the encoder to switch from the low-latency compression algorithm back to the high compression ratio algorithm. Subsequent GUI images are then compressed using the high compression ratio algorithm and transmitted to the client device 134.

The client device 134 may be any type of electronic device that enables a user to connect to and communicate with (e.g., via the Internet, a local area network (LAN), an ad hoc network, etc.) the server 130. Exemplary electronic devices include, without limitation, desktop computing devices, portable or hand-held computing devices, laptops, tablets, smartphones, mobile phones, video game consoles, personal digital assistants (PDAs), etc. In one embodiment, the client device 134 is hand-held game console which receives user input (e.g., via a gamepad, stylus, one or more fingers, hand gestures, eye motion, voice commands, etc.) and, based on input field information, processes the user input to generate one or more user input events, which are transmitted to the server 130.

Figure 1B:
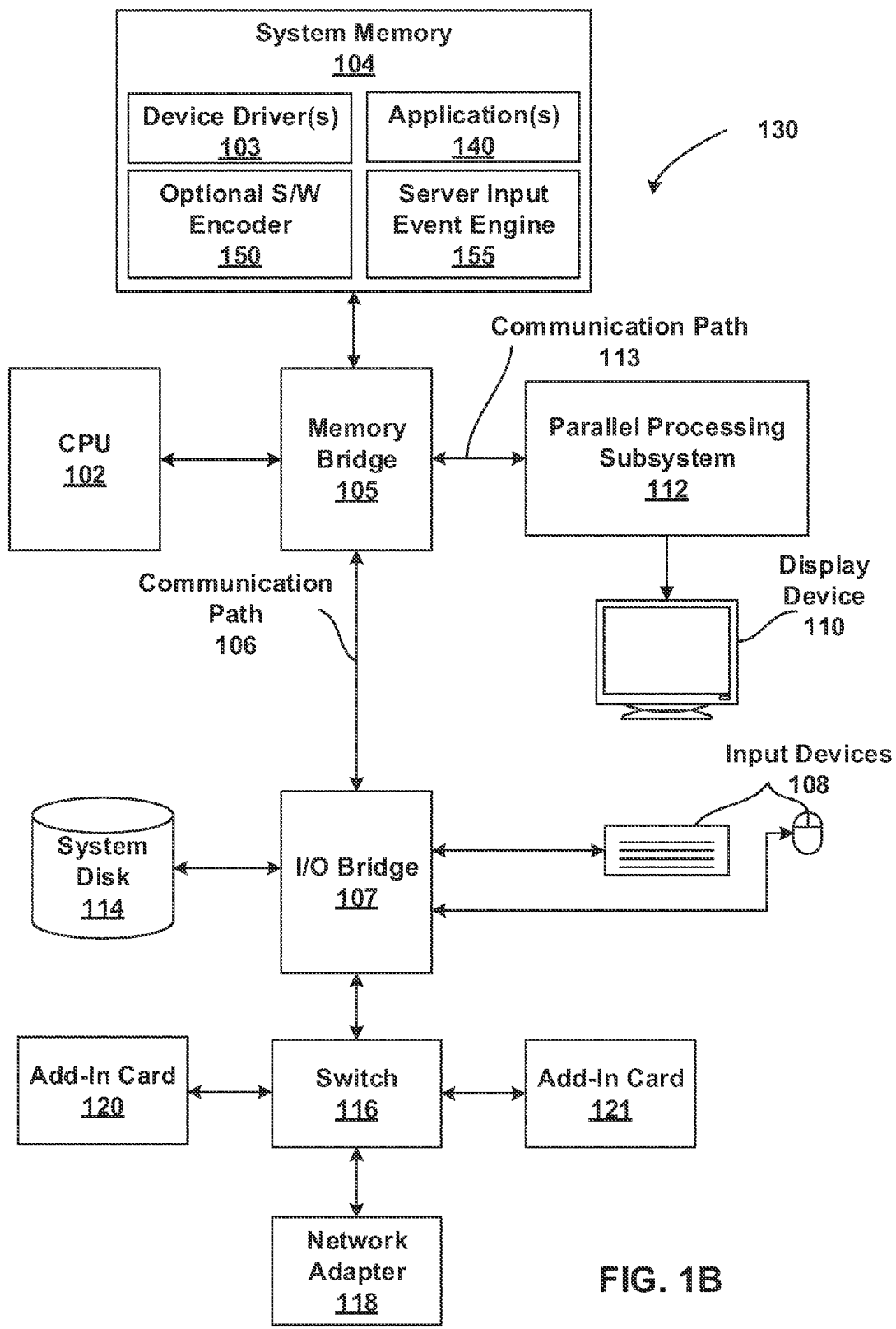
FIGS. 1B and 1C are block diagrams illustrating the server and a client device of FIG. 1A, respectively, according to one embodiment of the present invention.
Figure 1C:
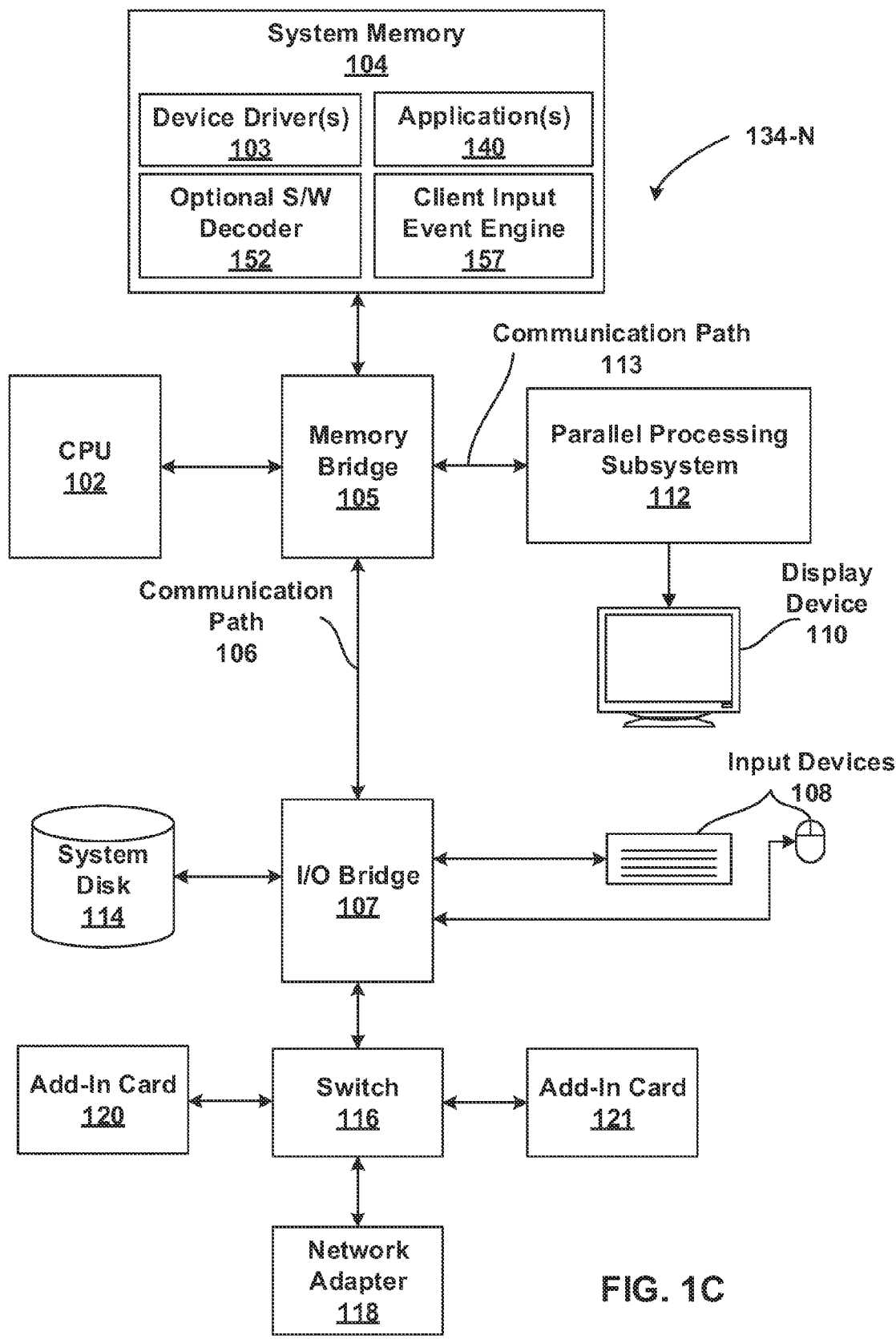

FIGS. 1B and 1C are block diagrams illustrating the server 130 and a client device 134 of FIG. 1A, respectively, according to one embodiment of the present invention. As shown, the server 130 and client device 134 may include, without limitation, a central processing unit (CPU) 102 and a system memory 104 coupled to a parallel processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

In operation, I/O bridge 107 is configured to receive user input information from input devices 108, such as a keyboard or a mouse, and forward the input information to CPU 102 for processing via communication path 106 and memory bridge 105. Switch 116 is configured to provide connections between I/O bridge 107 and other components of the computer system 100, such as a network adapter 118 and various add-in cards 120 and 121.

As also shown, I/O bridge 107 is coupled to a system disk 114 that may be configured to store content and applications and data for use by CPU 102 and parallel processing subsystem 112. As a general matter, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbrige chip. In addition, communication paths 106 and 113, as well as other communication paths within computer system 100, may be implemented using any technically suitable protocols, including, without limitation, AGP (Accelerated Graphics Port), PCI Express (Peripheral Component Interconnect Express), HyperTransport, or any other bus or point-to-point communication protocol known in the art.

In some embodiments, parallel processing subsystem 112 comprises a graphics subsystem that delivers pixels to a display device 110 that may be any conventional cathode ray tube, liquid crystal display, light-emitting diode display, or the like. In such embodiments, the parallel processing subsystem 112 incorporates circuitry optimized for graphics and video processing, including, for example, video output circuitry. As described in greater detail below in FIG. 2, such circuitry may be incorporated across one or more graphics processing units (CPUs) included within parallel processing subsystem 112. In other embodiments, the parallel processing subsystem 112 incorporates circuitry optimized for general purpose and/or compute processing. Again, such circuitry may be incorporated across one or more CPUs included within parallel processing subsystem 112 that are configured to perform such general purpose and/or compute operations. In yet other embodiments, the one or more CPUs included within parallel processing subsystem 112 may be configured to perform graphics processing, general purpose processing, and compute processing operations.

System memory 104 includes at least one device driver 103 configured to manage the processing operations of the one or more CPUs within parallel processing subsystem 112. With reference to FIG. 1B, the system memory 104 of the server 130 may further include an optional software encoder 150 and a server input engine 155. The optional software encoder 150 is configured to receive and compress GUI images for transmission to a client device 134. The server input event engine 155 is configured to receive user input events from a client device 134 and, in response, instruct an encoder (e.g., the optional software encoder 150) to switch from a first video compression algorithm to a second video compression algorithm. The server input event engine 155 is further configured to monitor for user input events and determine when a threshold period of time has elapsed since a user input event was last received from the client device 134. Once a threshold period of time has elapsed since a user input event was last received from the client device 134, the server input event engine 155 is configured to instruct the encoder to switch from the second video compression algorithm back to the first video compression algorithm. In one embodiment, the server input event engine 155 may be configured as a background process (e.g., a daemon) that is executed within an operating system and/or virtual machine on the server 130.

With reference to FIG. 1C, the system memory of the client device 134 may further include an optional software decoder 152 and a client input event engine 157. The optional software decoder 152 is configured to decode compressed GUI images received from the server 130. The client input event engine 157 is configured to receive user input generated with one or more input devices and transmit user input events to the server 130.

In various embodiments, parallel processing subsystem 112 may be integrated with one or more other the other elements of FIGS. 1B and/or 1C to form a single system. For example, parallel processing subsystem 112 may be integrated with CPU 102 and other connection circuitry on a single chip to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For example, in some embodiments, system memory 104 could be connected to CPU 102 directly rather than through memory bridge 105, and other devices would communicate with system memory 104 via memory bridge 105 and CPU 102. In other alternative topologies, parallel processing subsystem 112 may be connected to I/O bridge 107 or directly to CPU 102, rather than to memory bridge 105. In still other embodiments, I/O bridge 107 and memory bridge 105 may be integrated into a single chip instead of existing as one or more discrete devices. Lastly, in certain embodiments, one or more components shown in FIGS. 1B and 1C may not be present. For example, switch 116 could be eliminated, and network adapter 118 and add-in cards 120, 121 would connect directly to I/O bridge 107.

Figure 2:
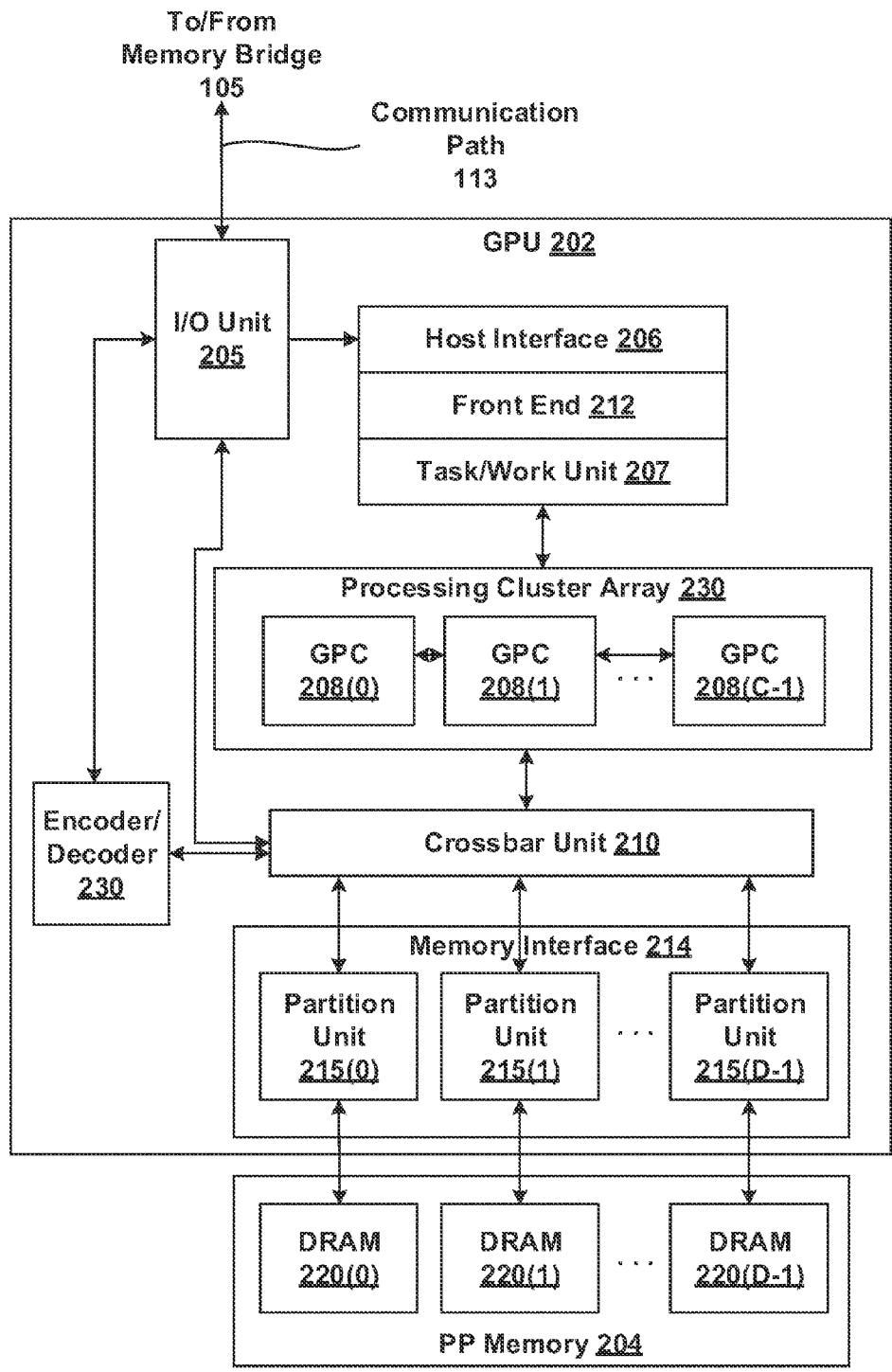
FIG. 2 is a block diagram of a graphics processing unit (GPU) included in the parallel processing subsystem of FIGS. 1B and 1C, according to one embodiment of the present invention.

FIG. 2 is a block diagram of a graphics processing unit (GPU) 202 included in the parallel processing subsystem 112 of FIGS. 1B and 1C, according to one embodiment of the present invention. Although FIG. 2 depicts one GPU 202, as indicated above, parallel processing subsystem 112 may include any number of CPUs 202. As shown, GPU 202 is coupled to a local parallel processing (PP) memory 204. GPU 202 and PP memory 204 may be implemented using one or more integrated circuit devices, such as programmable processors, application specific integrated circuits (ASICs), or memory devices, or in any other technically feasible fashion.

In some embodiments, CPU 202 comprises a graphics processing unit (GPU) that may be configured to implement a graphics rendering pipeline to perform various operations related to generating pixel data based on graphics data supplied by CPU 102 and/or system memory 104. When processing graphics data, PP memory 204 can be used as graphics memory that stores one or more conventional frame buffers and, if needed, one or more other render targets as well. Among other things, PP memory 204 may be used to store and update pixel data and deliver final pixel data or display frames to display device 110 for display. In some embodiments, GPU 202 also may be configured for general-purpose processing and compute operations.

In operation, CPU 102 is the master processor of computer system 100, controlling and coordinating operations of other system components. In particular, CPU 102 issues commands that control the operation of CPU 202. In some embodiments, CPU 102 writes a stream of commands for CPU 202 to a data structure (not explicitly shown in FIG. 1B, 1C, or FIG. 2) that may be located in system memory 104, PP memory 204, or another storage location accessible to both CPU 102 and CPU 202. A pointer to the data structure is written to a pushbuffer to initiate processing of the stream of commands in the data structure. The GPU 202 reads command streams from the pushbuffer and then executes commands asynchronously relative to the operation of CPU 102. In embodiments where multiple pushbuffers are generated, execution priorities may be specified for each pushbuffer by an application program via device driver 103 to control scheduling of the different pushbuffers.

As also shown, CPU 202 includes an I/O (input/output) unit 205 that communicates with the rest of computer system 100 via the communication path 113 and memory bridge 105. I/O unit 205 generates packets (or other signals) for transmission on communication path 113 and also receives all incoming packets (or other signals) from communication path 113, directing the incoming packets to appropriate components of CPU 202. For example, commands related to processing tasks may be directed to a host interface 206, while commands related to memory operations (e.g., reading from or writing to PP memory 204) may be directed to a crossbar unit 210. Host interface 206 reads each pushbuffer and transmits the command stream stored in the pushbuffer to a front end 212.

As mentioned above in conjunction with FIGS. 1B and 1C, the connection of CPU 202 to the rest of computer system 100 may be varied. In some embodiments, parallel processing subsystem 112, which includes at least one CPU 202, is implemented as an add-in card that can be inserted into an expansion slot of computer system 100. In other embodiments, CPU 202 can be integrated on a single chip with a bus bridge, such as memory bridge 105 or I/O bridge 107. Again, in still other embodiments, some or all of the elements of CPU 202 may be included along with CPU 102 in a single integrated circuit or system of chip (SoC).

In operation, front end 212 transmits processing tasks received from host interface 206 to a work distribution unit (not shown) within task/work unit 207. The work distribution unit receives pointers to processing tasks that are encoded as task metadata (TMD) and stored in memory. The pointers to TMDs are included in a command stream that is stored as a pushbuffer and received by the front end unit 212 from the host interface 206. Processing tasks that may be encoded as TMDs include indices associated with the data to be processed as well as state parameters and commands that define how the data is to be processed. For example, the state parameters and commands could define the program to be executed on the data. The task/work unit 207 receives tasks from the front end 212 and ensures that GPCs 208 are configured to a valid state before the processing task specified by each one of the TMDs is initiated. A priority may be specified for each TMD that is used to schedule the execution of the processing task. Processing tasks also may be received from the processing cluster array 230. Optionally, the TMD may include a parameter that controls whether the TMD is added to the head or the tail of a list of processing tasks (or to a list of pointers to the processing tasks), thereby providing another level of control over execution priority.

GPU 202 advantageously implements a highly parallel processing architecture based on a processing cluster array 230 that includes a set of C general processing clusters (GPCs) 208, where $C \geq 1$. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary depending on the workload arising for each type of program or computation.

Memory interface 214 includes a set of D of partition units 215, where $D \geq 1$. Each partition unit 215 is coupled to one or more dynamic random access memories (DRAMs) 220 residing within PPM memory 204. In one embodiment, the number of partition units 215 equals the number of DRAMs 220, and each partition unit 215 is coupled to a different DRAM 220. In other embodiments, the number of partition units 215 may be different than the number of DRAMs 220. Persons of ordinary skill in the art will appreciate that a DRAM 220 may be replaced with any other technically suitable storage device. In operation, various render targets, such as texture maps and frame buffers, may be stored across DRAMs 220, allowing partition units 215 to write portions of each render target in parallel to efficiently use the available bandwidth of PP memory 204.

A given GPC 208 may process data to be written to any of the DRAMs 220 within PP memory 204. Crossbar unit 210 is configured to route the output of each GPC 208 to the input of any partition unit 215 or to any other GPC 208 for further processing. GPCs 208 communicate with memory interface 214 via crossbar unit 210 to read from or write to various DRAMs 220. In one embodiment, crossbar unit 210 has a connection to I/O unit 205, in addition to a connection to PP memory 204 via memory interface 214, thereby enabling the processing cores within the different GPCs 208 to communicate with system memory 104 or other memory not local to GPU 202. In the embodiment of FIG. 2, crossbar unit 210 is directly connected with I/O unit 205. In various embodiments, crossbar unit 210 may use virtual channels to separate traffic streams between the GPCs 208 and partition units 215.

Again, GPCs 208 can be programmed to execute processing tasks relating to a wide variety of applications, including, without limitation, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel/fragment shader programs), general compute operations, etc. In operation, GPU 202 is configured to transfer data from system memory 104 and/or PP memory 204 to one or more on-chip memory units, process the data, and write result data back to system memory 104 and/or PP memory 204. The result data may then be accessed by other system components, including CPU 102, another GPU 202 within parallel processing subsystem 112, or another parallel processing subsystem 112 within computer system 100.

As noted above, any number of CPUs 202 may be included in a parallel processing subsystem 112. For example, multiple CPUs 202 may be provided on a single add-in card, or multiple add-in cards may be connected to communication path 113, or one or more of CPUs 202 may be integrated into a bridge chip. CPUs 202 in a multi-CPU system may be identical to or different from one another. For example, different GPUs 202 might have different numbers of processing cores and/or different amounts of PP memory 204. In implementations where multiple CPUs 202 are present, those CPUs may be operated in parallel to process data at a higher throughput than is possible with a single GPU 202. Systems incorporating one or more GPUs 202 may be implemented in a variety of configurations and form factors, including, without limitation, desktops, laptops, handheld personal computers or other handheld devices, servers, workstations, game consoles, embedded systems, and the like.

An encoder/decoder 230 may communicate with memory interface 214 via crossbar unit 210 to read from or write to the DRAMs 220. For example, in the server 130, the encoder/decoder 230 is configured to read frame data (e.g., YUV or RGB pixel data) from the DRAMs 220 and apply a video compression algorithm to the frame data to generate encoded video frames. Encoded video frames are then sent through the I/O Unit 205 to the network adapter 118 for transmission to a client device 134. In another example, in the client device 134, the encoder/decoder 230 is configured to decode video frames received from the server 130 and store the decoded video frames in the DRAMs 220 for display on the display device 110. In some embodiments, the encoder/decoder 230 may be configured to perform either encoding or decoding. For example, the encoder/decoder 230 included in the parallel processing subsystem 112 of the server 130 may be configured to perform only encoding. In other embodiments, the encoder/decoder 230 may be configured to perform both encoding and decoding.

The encoder/decoder 230 may be configured to encode and/or decode data based on different video compression algorithms, such as H.263, H.264, VP8, High Efficiency Video Coding (HEVC), and the like. In general, lossy video compression algorithms compress frame data using a combination of intraframe compression algorithms and interframe compression algorithms. Intraframe compression algorithms reduce video data rate by compressing individual video frames in isolation, without reference to other video frames. For example, an intraframe compression algorithm may perform spatial compression by detecting similarities between macroblocks or coding tree units (e.g., 16×16 pixel blocks) included in a single video frame. Frame data associated with these similarities is then consolidated, reducing the size of the video frame without significantly affecting the visual quality of the video frame.

In contrast, interframe compression algorithms reduce video data rate by detecting similarities between macroblocks or coding tree units in a given video frame and macroblocks or coding tree units in one or more preceding and/or subsequent video frames. For example, an interframe compression algorithm may detect similarities and differences between macroblocks in a current video frame and macroblocks in a preceding video frame. The interframe compression algorithm may then encode the current video frame by storing only what has changed between the preceding video frame and the current video frame. That is, the current video frame is encoded with reference to the preceding video frame. This technique is commonly referred to as predictive frame (P-frame) encoding. Additionally, another interframe compression algorithm may detect similarities and differences between macroblocks in a current video frame and macroblocks in both a preceding video frame and a subsequent video frame. This interframe compression algorithm then encodes the current video frame by storing the differences between the preceding video frame and the current video frame as well as the differences between the subsequent video frame and the current video frame. This technique is commonly referred to as bi-directional frame (B-frame) encoding. Exemplary video frames encoded based on intraframe and interframe compression algorithms are described in further detail below with respect to FIGS. 3A-3C.

Adaptive Video Compression for Latency Control

Figure 3A:
FIGS. 3A-3C illustrate video frames arranged in order of display when encoded based on intraframe compression algorithms and interframe compression algorithms, according to one embodiment of the present invention.
Figure 3B:
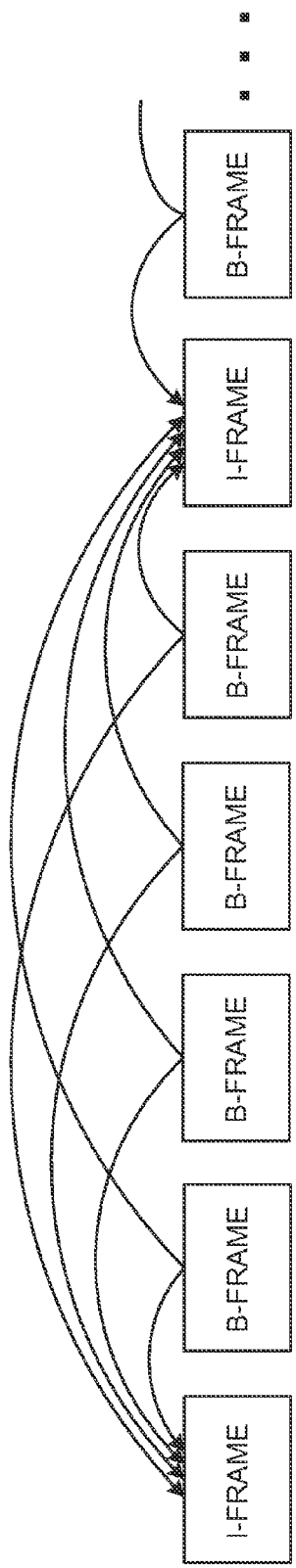
Figure 3C:
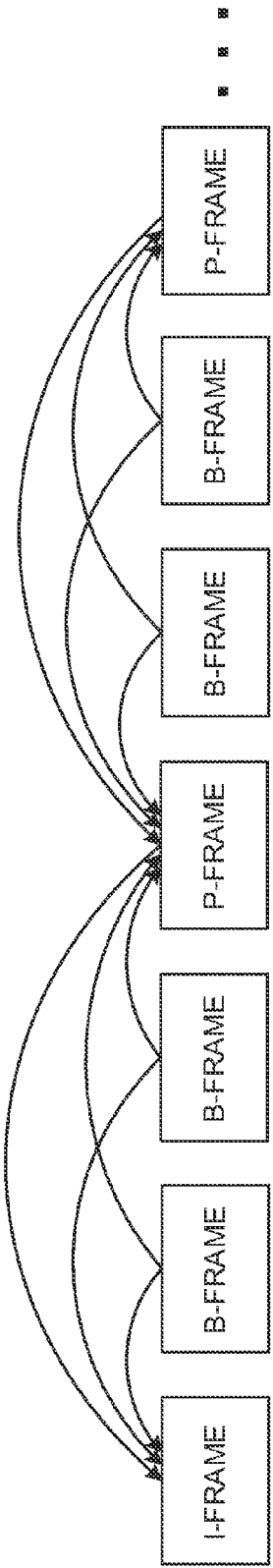

FIGS. 3A-3C illustrate video frames arranged in order of display when encoded based on intraframe compression algorithms and interframe compression algorithms, according to one embodiment of the present invention. As shown, P-frames are encoded based on a preceding intra frame (I-frame) or P-frame. B-frames, on the other hand, are encoded based on both a preceding I-frame or P-frame and a subsequent I-frame or P-frame. In general, each series of encoded video frames begins with an I-frame that is referenced by subsequent P-frames and/or B-frames.

In FIG. 3A, each I-frame is followed by a plurality of P-frames when the encoded video frames are arranged in order of display. Each P-frame is encoded based on the preceding I-frame or P-frame. That is, each P-frame encodes the differences between the current video frame and the previous I-frame or P-frame. During operation of the server 130, I-frames and P-frames may be encoded by the encoder/decoder 230 (and/or optional software encoder 150) based on frame data (e.g., GUI image data) stored in the DRAMs 220. The encoded video frames are then transmitted to a client device 134 in a temporally sequential order. For example, each I-frame and P-frame may be encoded by the server 130 and immediately transmitted to a client device 134 for display to a user. As such, when a user of a client device 134 interacts with a software application 140 executing on the server 130, the latency associated with (1) receiving a user input event, (2) updating a GUI based on the user input event, and (3) transmitting an updated GUI image back to the user may be increased only by the additional time required to encode the next video frame. Accordingly, P-frame encoding algorithms may be referred to as low-latency compression algorithms, since video frames generally are transmitted to a client device 134 immediately after they are encoded.

In FIG. 3B, each I-frame is followed by a plurality of B-frames when the encoded video frames are arranged in order of display. Each B-frame is encoded based on the preceding I-frame and the next I-frame. That is, each B-frame encodes the differences between the current video frame and the previous I-frame as well as the differences between the current video frame and the next I-frame. In FIG. 3C, each I-frame is followed by both B-frames and P-frames. As shown, each B-frame may be encoded based on the preceding reference frame (e.g., I-frame or P-frame) as well as the next reference frame. By referencing both preceding and subsequent video frames, bi-directional video compression algorithms may significantly increase compression efficiency as compared to predictive encoding algorithms. However, because bi-directional encoding of a current video frame requires information from a future video frame, such algorithms may increase latency as compared to predictive video compression techniques.

In one example of B-frame encoding, shown in FIG. 3B, a first I-frame may be encoded by the encoder/decoder 230 (and/or optional software encoder 150) based on frame data stored in the DRAMs 220. Next, frame data associated with the next four frames may be buffered until the next I-frame is encoded. Once the next I-frame is encoded, the buffered frame data is flushed and four B-frames are encoded, each of which references both the preceding I-frame and the subsequent I-frame. Consequently, the four B-frames cannot be encoded and transmitted until the preceding and subsequent I-frames have been received and encoded. As such, latency is increased by the additional time required to generate, encode, and transmit the next I-frame or P-frame. Thus, although B-frame encoding algorithms generally offer higher compression ratios, the latency associated with generating, encoding, and transmitting B-frames is generally higher than with predictive and intraframe compression techniques.

The video compression algorithms described above are suitable for use in a variety of computing applications. For example, in the cloud computing applications described herein, GUI images associated with a software application executing on a server 130 are transmitted to a client device 134. The client device 134 may be a low-power mobile device configured to receive encoded video frames from the server 130 and decode and display the video frames to a user. In general, high compression ratio algorithms, such as bi-directional compression algorithms, enable high-resolution video data to be streamed to a client device 134 at relatively low data rates. As a result, high compression ratio algorithms are useful when the client device 134 is communicating with the server 130 over a network in which bandwidth is a limiting factor. However, when the user is interacting with a real-time and/or latency-sensitive software application 140 executing on the server 130, the latency generated by high compression ratio algorithms may detract from the user experience. For example, when the user is interacting with video game software executing on the server 130, even small increases in latency generated by high compression ratio algorithms may interfere with the user's reaction time and ability to compete with opponents. Accordingly, in various embodiments, when a user is operating an input device 108 to interact with the software application 140, video frame data may be encoded based on a low-latency compression algorithm. Further, when the user has not interacted with the software application 140 for a threshold period of time, video frame data may be encoded based on a high compression ratio algorithm. An exemplary method which implements this hybrid approach is described below in conjunction with FIGS. 4 and 5.

Figure 4:
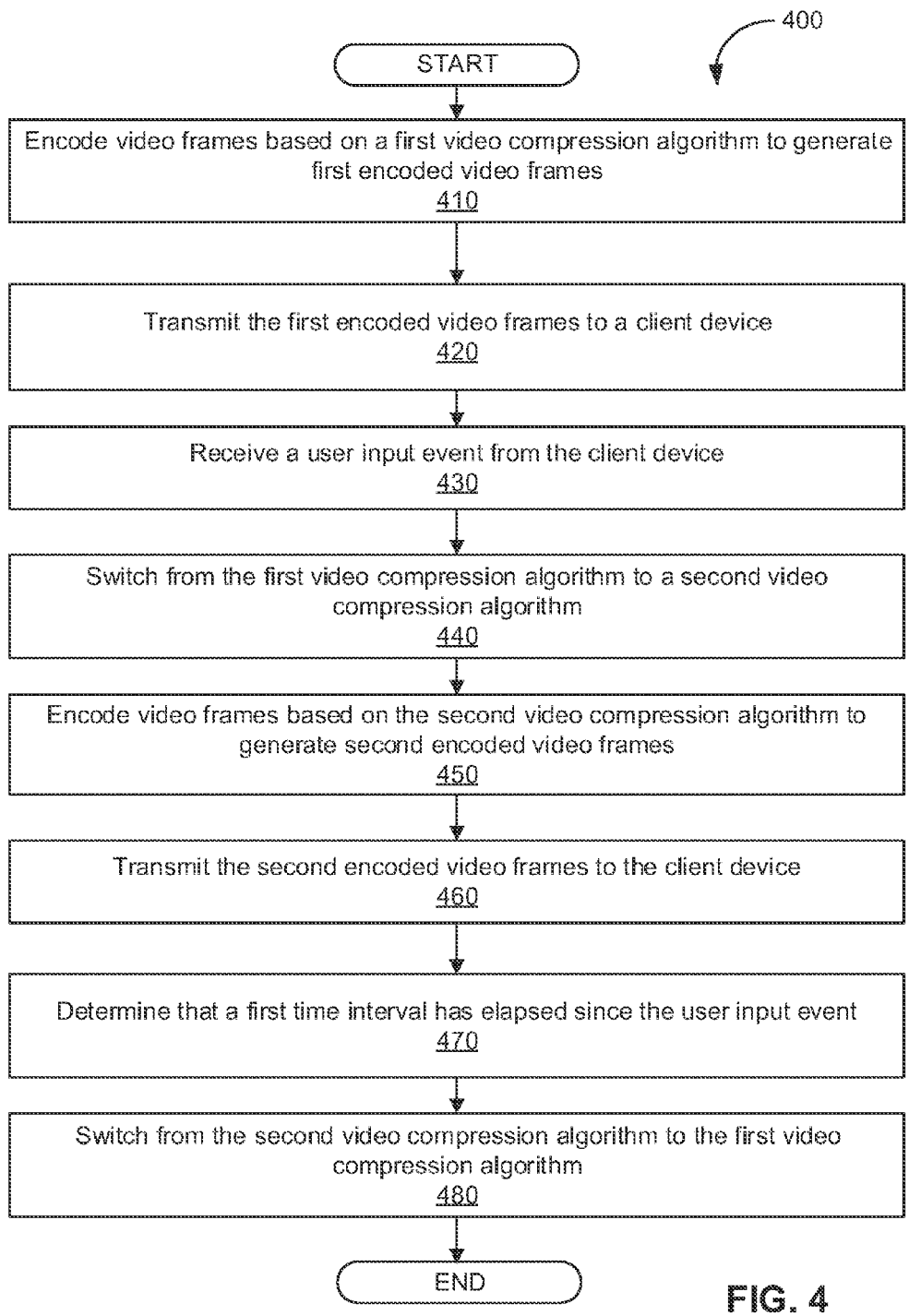
FIG. 4 is a flow diagram of method steps for adaptively compressing video frames, according to one embodiment of the present invention.

FIG. 4 is a flow diagram of method steps for adaptively compressing video frames, according to one embodiment of the present invention. Although the method steps are described in conjunction with the systems of FIGS. 1A-3C, persons skilled in the art will understand that any system configured to perform the method steps, in any order, falls within the scope of the present invention.

As shown, a method 400 begins at step 410, where the encoder/decoder 230 (and/or optional software encoder 150) included in the server 130 encodes video frame data based on a first video compression algorithm to generate first encoded video frames. The first video compression algorithm may include a high compression ratio algorithm, such as a bi-directional compression algorithm. At step 420, the first encoded video frames are transmitted to a client device 134. Next, at step 430, the server input event engine 155 receives a user input event 510 from the client input event engine 157 in the client device 134.

Figure 5:
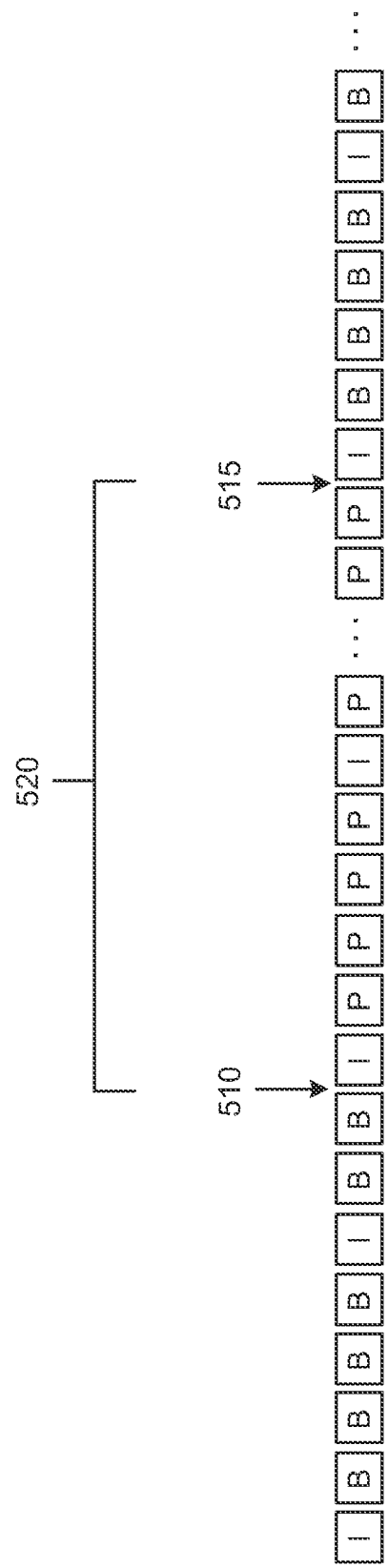
FIG. 5 illustrates encoded video frames generated when switching between a first video compression algorithm and a second video compression algorithm, according to one embodiment of the present invention.

A user input event 510—indicating that the user recently interacted with an input device 108—may be transmitted in any suitable format. In one embodiment, user input events are packetized and an instruction to switch from the first video compression algorithm to the second video compression algorithm is specified in a header of the user input event packet. Receipt of a user input event 510 is shown in FIG. 5, which illustrates encoded video frames generated when switching between a first video compression algorithm and a second video compression algorithm, according to one embodiment of the present invention.

In response to receiving the user input event 510, the server input event engine 155 instructs the encoder/decoder 230 to switch from the first video compression algorithm to a second video compression algorithm at step 440. The second video compression algorithm may include a low-latency compression algorithm, such as an intraframe compression algorithm and a predictive compression algorithm. Further, in order to reduce latency associated with compressing the video frame data, the second video compression algorithm may not include a bi-directional compression algorithm. At step 450, video frame data is encoded based on the second video compression algorithm to generate second encoded video frames. The second encoded video frames are then transmitted to the client device 134 at step 460.

Upon switching from the first video compression algorithm to the second video compression algorithm, the encoder/decoder 230 may generate an I-frame, flush buffered frame data, encode one or more B-frames and/or P-frames based on the flushed frame data and the I-frame, and transmit the I-frame, B-frames, and/or P-frames to the client device 134. In one embodiment, an I-frame is the first frame encoded by the encoder/decoder 230 after receiving a user input event 510, as shown in FIG. 5. That is, in order to quickly transmit buffered frame data to the client device 134, the next frame encoded by the encoder/decoder 230 may be encoded as an I-frame, enabling the buffered frame data to be encoded based on the I-frame. In another embodiment, a P-frame is the first frame encoded by the encoder/decoder 230 after receiving a user input event 510, enabling the buffered frame data to be encoded based on the P-frame.

Next, at step 470, the server input event engine 155 determines that a threshold period of time 520 has elapsed since a user input event 510 was received from the client device 134. In response, the server input event engine 155 instructs the encoder/decoder 230 to switch from the second video compression algorithm back to the first video compression algorithm at step 480. For example, as shown in FIG. 5, after the threshold period of time 520 has elapsed, the encoder/decoder 230 switches back to the high compression ratio algorithm at time 515 and starts encoding B-frames once again. In various embodiments, the threshold period of time 520 is between approximately 500 milliseconds and approximately 1500 milliseconds. For example, a threshold period of time of approximately 1 second may enable the server 130 to efficiently transmit encoded video frames based on both a high compression ratio algorithm and a low-latency compression algorithm.

In sum, an input event engine receives from a client device a user input event which indicates that a user is interacting with the GUI. The input event engine then instructs an encoder to switch from a first video compression algorithm, such as bi-directional interframe compression, to a second video compression algorithm, such as predictive interframe compression. Once the input event engine receives the user input event, the encoder may further flush buffered frame data, generate an intra frame, and transmit the intra frame and any preceding encoded frames to the client device. The encoder then uses the second video compression algorithm to generate encoded frame data. When the input event engine determines that a threshold period of time has elapsed since a user input event was last received from the client device, the input event engine then instructs the encoder to switch back to the first video compression algorithm.

One advantage of the technique described herein is that a video compression algorithm can be dynamically selected to compress GUI images based on whether a user is currently interacting with the GUI. A high compression ratio algorithm may be used when a user has not interacted with the GUI for a threshold period of time, and a low-latency algorithm may be used while the user is interacting with the GUI and/or when the user has previously interacted with the GUI within a threshold period of time. Thus, the disclosed technique, among other things, provides a lower-bandwidth remote connection when a user is not interacting with the GUI and a lower-latency remote connection when the user is interacting with the GUI, thereby enabling more effective interactions with real-time and/or latency-sensitive applications.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disc read only memory (CD-ROM) disks readable by a CD-ROM drive, flash memory, read only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of embodiments of the present invention is set forth in the claims that follow.

What is claimed is:

1. A computer-implemented method for adaptively compressing video frames, the method comprising:
   encoding a first plurality of video frames based on a first video compression algorithm to generate first encoded video frames;
   transmitting the first encoded video frames to a client device;
   receiving a user input event;
   switching from the first video compression algorithm to a second video compression algorithm in response to the user input event;
   encoding a second plurality of video frames based on the second video compression algorithm to generate second encoded video frames;
   transmitting the second encoded video frames to the client device;
   determining that a threshold period of time has elapsed since receiving the user input event; and
   in response to determining that the threshold period of time has elapsed, switching from the second video compression algorithm to the first video compression algorithm, wherein the first video compression algorithm requires less network bandwidth for transmitting data than the second video compression algorithm, and the first video compression algorithm results in greater latency when encoding data than the second video compression algorithm.

2. The method of claim 1, wherein the first video compression algorithm is configured to generate bi-directional frames and the second video compression algorithm does not generate bi-directional frames.

3. The method of claim 2, wherein the second video compression algorithm is configured to generate predictive frames and intra frames.

4. The method of claim 1, further comprising, in response to receiving the user input event, generating an intra frame, and flushing buffered video frame data to generate at least a portion of the first encoded video frames.

5. The method of claim 4, further comprising generating a plurality of bi-directional frames based on the buffered video frame data, wherein the plurality of bi-directional frames temporally precedes the intra frame and reference the intra frame.

6. The method of claim 1, wherein encoding the first plurality of video frames comprises generating an intra frame as the first encoded video frame generated after receiving the user input event.

7. The method of claim 1, further comprising:
encoding a third plurality of video frames based on the first video compression algorithm to generate third encoded video frames; and
transmitting the third encoded video frames to the client device.

8. The method of claim 7, wherein the threshold period of time is between approximately 500 milliseconds and approximately 1500 milliseconds.

9. A non-transitory computer-readable storage medium including instructions that, when executed by a processing unit, cause the processing unit to adaptively compress video frames, by performing the steps of:
encoding a first plurality of video frames based on a first video compression algorithm to generate first encoded video frames;
transmitting the first encoded video frames to a client device;
receiving a user input event;
switching from the first video compression algorithm to a second video compression algorithm in response to the user input event;
encoding a second plurality of video frames based on the second video compression algorithm to generate second encoded video frames;
transmitting the second encoded video frames to the client device;
determining that a threshold period of time has elapsed since receiving the user input event; and
in response to determining that the threshold period of time has elapsed, switching from the second video compression algorithm to the first video compression algorithm, wherein the first video compression algorithm requires less network bandwidth for transmitting data than the second video compression algorithm, and the first video compression algorithm results in greater latency when encoding data than the second video compression algorithm.

10. The non-transitory computer-readable storage medium of claim 9, wherein the first video compression algorithm is configured to generate bi-directional frames and the second video compression algorithm does not generate bi-directional frames.

11. The non-transitory computer-readable storage medium of claim 10, wherein the second video compression algorithm is configured to generate predictive frames and intra frames.

12. The non-transitory computer-readable storage medium of claim 9, further comprising, in response to receiving the user input event, generating an intra frame, and flushing buffered video frame data to generate at least a portion of the first encoded video frames.

13. The non-transitory computer-readable storage medium of claim 12, further comprising generating a plurality of bi-directional frames based on the buffered video frame data, wherein the plurality of bi-directional frames temporally precedes the intra frame and reference the intra frame.

14. The non-transitory computer-readable storage medium of claim 9, wherein encoding the first plurality of video frames comprises generating an intra frame as the first encoded video frame generated after receiving the user input event.

15. The non-transitory computer-readable storage medium of claim 9, further comprising performing the steps of:
encoding a third plurality of video frames based on the first video compression algorithm to generate third encoded video frames; and
transmitting the third encoded video frames to the client device.

16. The non-transitory computer-readable storage medium of claim 15, wherein the threshold period of time is between approximately 500 milliseconds and approximately 1500 milliseconds.

17. A computing device, comprising:
a memory; and
a processing unit coupled to the memory and configured to adaptively compress video frames by:
encoding a first plurality of video frames based on a first video compression algorithm to generate first encoded video frames;
transmitting the first encoded video frames to a client device;
receiving a user input event;
switching from the first video compression algorithm to a second video compression algorithm in response to the user input event;
encoding a second plurality of video frames based on the second video compression algorithm to generate second encoded video frames;
transmitting the second encoded video frames to the client device;
determining that a threshold period of time has elapsed since receiving the user input event; and
in response to determining that the threshold period of time has elapsed, switching from the second video compression algorithm to the first video compression algorithm, wherein the first video compression algorithm requires less network bandwidth for transmitting data than the second video compression algorithm, and the first video compression algorithm results in greater latency when encoding data than the second video compression algorithm.

18. The computing device of claim 17, wherein the first video compression algorithm is configured to generate bi-directional frames and the second video compression algorithm does not generate bi-directional frames.

19. The method of claim 1, wherein the second video compression algorithm comprises a predictive frame encoding algorithm.

20. The method of claim 1, wherein:
the first video compression algorithm references at least one preceding video frame and at least one subsequent video frame; and
the second video compression algorithm references at least one preceding video frame and does not reference any subsequent video frame.

21. The method of claim 1, wherein:
the first video compression algorithm detects similarities and differences between a current video frame and at least one preceding video frame and the current video frame and at least one subsequent video frame; and the second video compression algorithm detects similarities and differences between the current video frame and at least one preceding video frame and does not detect similarities and differences between the current video frame and any subsequent video frame.

* * * * *